(12) United States Patent
Chen et al.

(10) Patent No.: US 9,985,737 B2
(45) Date of Patent: May 29, 2018

(54) WAN INTERFACE BASED 1588V2 PACKET TRANSMISSION METHOD AND APPARATUS

(71) Applicant: Huawei Technologies Co., Ltd., Shenzhen, Guangdong (CN)

(72) Inventors: Liqing Chen, Shenzhen (CN); Tao Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 132 days.

(21) Appl. No.: 15/142,050

(22) Filed: Apr. 29, 2016

(65) Prior Publication Data

US 2016/0248530 A1    Aug. 25, 2016

Related U.S. Application Data

(63) Continuation of application No. PCT/CN2014/084054, filed on Aug. 11, 2014.

(30) Foreign Application Priority Data

Oct. 31, 2013 (CN) .......................... 2013 1 0530556

(51) Int. Cl.
*H04J 3/06* (2006.01)
*H04L 12/28* (2006.01)
(Continued)

(52) U.S. Cl.
CPC ........ *H04J 3/0667* (2013.01); *H04L 12/2854* (2013.01); *H04L 29/12575* (2013.01);
(Continued)

(58) Field of Classification Search
CPC .............. H04J 3/0667; H04L 61/6022; H04L 29/12575; H04L 12/2854; H04L 45/745; H04L 2012/5652
See application file for complete search history.

(56) References Cited

U.S. PATENT DOCUMENTS 8,902,932 B2 * 12/2014 Belhadj ................. H04J 3/0667
                                                   370/503
2001/0012288 A1    8/2001  Yu et al.
(Continued)

FOREIGN PATENT DOCUMENTS

CN        1310905 A       8/2001
CN      101009516 A       8/2007
(Continued)

OTHER PUBLICATIONS

IEEE Standard 1588 (2002), "IEEE Standard for a Precision Clock Synchronization Protocol for Networked Measurement and Control Systems," IEEE Instrumentation and Measurement Society, TC9-Technical Committee on Sensor Technology, The Institute of Electrical and Electronics Engineers, Inc., New York, NY, Nov. 8, 2002, 154 pages.
(Continued)

*Primary Examiner* — Phuc Tran

(57) ABSTRACT

Embodiments of the present invention disclose a WAN interface based 1588V2 packet transmission method and apparatus, which relate to the field of communications technologies and can reduce complexity of 1588V2 packet transmission. The method includes: first, inserting, by a sending end, a 1588V2 packet into a payload area of a data frame, and sending, to a receiving end, the data frame carrying the 1588V2 packet; then, receiving, by the receiving end, the data frame that is sent by the sending end and carries the 1588V2 packet, and acquiring a receiving time at which the data frame is received; and finally, performing, by the receiving end, time synchronization adjustment on the receiving time. The embodiments of the present invention are applicable to 1588V2 packet transmission between networks.

4 Claims, 5 Drawing Sheets

(51) Int. Cl.
  *H04L 29/12* (2006.01)
  *H04L 12/741* (2013.01)
  *H04L 12/70* (2013.01)

(52) U.S. Cl.
  CPC ........ *H04L 45/745* (2013.01); *H04L 61/6022*
  (2013.01); *H04L 2012/5652* (2013.01)

(56) References Cited

U.S. PATENT DOCUMENTS

| | | | |
|---|---|---|---|
| 2002/0031126 A1 | 3/2002 | Crichton et al. | |
| 2004/0252995 A1 | 12/2004 | Ovadia et al. | |
| 2008/0075069 A1 | 3/2008 | Fourcand | |
| 2011/0182580 A1 | 7/2011 | Yin | |
| 2012/0155497 A1 | 6/2012 | Lee et al. | |
| 2013/0003757 A1 | 1/2013 | Boatright | |
| 2014/0010244 A1* | 1/2014 | Bui | H04J 3/0667 370/503 |
| 2014/0023369 A1* | 1/2014 | Zheng | H04J 3/0697 398/66 |
| 2014/0108338 A1 | 4/2014 | Kang et al. | |
| 2014/0133480 A1* | 5/2014 | Ehlers | H04L 12/4625 370/350 |

FOREIGN PATENT DOCUMENTS

| | | |
|---|---|---|
| CN | 101052045 A | 10/2007 |
| CN | 101123491 A | 2/2008 |
| CN | 101378399 A | 3/2009 |

OTHER PUBLICATIONS

"IEEE Standard for a Precision Clock Synchronization Protocol for Networked Measurement and Control Systems, IEEE Instrumentation and Measurement Society", IEEE Std 1588, Jul. 24, 2008, 289 pages.

Qin Honglei et al., "Wireless LXI Bus Clock Synchronization and Triggering Design", IEEE Transactions on Instrumentation and Measurement, vol. 59, No. 9, Sep. 2010, p. 2420-2430.

* cited by examiner

WAN INTERFACE BASED 1588V2 PACKET TRANSMISSION METHOD AND APPARATUS

CROSS-REFERENCE TO RELATED APPLICATIONS

This application is a continuation of International Application No. PCT/CN2014/084054, filed on Aug. 11, 2014, which claims priority to Chinese Patent Application No. 201310530556.7, filed on Oct. 31, 2013, both of which are hereby incorporated by reference in their entireties.

TECHNICAL FIELD

The present invention relates to the field of communications technologies, and in particular, to a WAN interface based 1588V2 packet transmission method and apparatus.

BACKGROUND

Increasingly wide application of IP (Internet Protocol, Internet Protocol) networks leads to increasingly frequent interaction between an IP network and an SDH (Synchronous Digital Hierarchy, synchronous digital hierarchy) network and between an IP network and an IP network. Between an IP network and an SDH network and between an IP network and an IP network, a packet is transmitted by using a WAN (Wide Area Network, wide area network) interface.

Currently, in a WAN interface based 1588V2 packet transmission process, a sending end slices a 1588V2 packet by using an assisting module, and inserts a 1588V2 packet slice into an OH (Overhead, system overhead) overhead segment for transmission; a receiving end extracts the 1588V2 packet slice separately from each received OH overhead segment, and reassembles all extracted 1588V2 packet slices by using the assisting module. However, currently, to insert the 1588V2 packet slice into the OH overhead segment for transmission, an assisting module is needed to slice and reassemble the 1588V2 packet, thereby resulting in high complexity of 1588V2 packet transmission.

SUMMARY

Embodiments of the present invention provide a WAN interface based 1588V2 packet transmission method and apparatus, which can reduce complexity of 1588V2 packet transmission.

Technical solutions used in the embodiments of the present invention are:

According to a first aspect, an embodiment of the present invention provides a WAN interface based 1588V2 packet transmission method, including:

inserting, by a sending end, a 1588V2 packet into a payload area of a data frame; and sending, by the sending end, to a receiving end, the data frame carrying the 1588V2 packet, so that the receiving end performs time synchronization adjustment on a receiving time at which the data frame is received.

In a first implementation manner of the first aspect, before the step of inserting, by a sending end, a 1588V2 packet into a payload area of a data frame, the method further includes:

encapsulating, by the sending end, the 1588V2 packet, where the step of inserting, by a sending end, a 1588V2 packet into a payload area of a data frame includes:

inserting, by the sending end, the encapsulated 1588V2 packet into the payload area of the data frame.

According to a second aspect, an embodiment of the present invention provides a WAN interface based 1588V2 packet transmission apparatus, including:

an inserting unit, configured to insert a 1588V2 packet into a payload area of a data frame; and a sending unit, configured to send, to a receiving end, the data frame carrying the 1588V2 packet inserted by the inserting unit.

In a first implementation manner of the second aspect, the apparatus further includes:

an encapsulating unit, configured to encapsulate the 1588V2 packet, where the inserting unit is further configured to insert the 1588V2 packet, encapsulated by the encapsulating unit, into the payload area of the data frame.

According to a third aspect, an embodiment of the present invention provides a WAN interface based 1588V2 packet transmission method, including:

receiving, by a receiving end, a data frame that is sent by a sending end and carries a 1588V2 packet;

acquiring, by the receiving end, a receiving time at which the data frame is received; and performing, by the receiving end, time synchronization adjustment on the receiving time.

In a first implementation manner of the third aspect, before the step of performing, by the receiving end, time synchronization adjustment on the receiving time, the method further includes:

configuring, by the receiving end, a synchronous counter separately for a wide area network interface WIS sublayer and a media access control MAC sublayer;

when the data frame carrying the 1588V2 packet is transmitted to the WIS sublayer, acquiring, by the receiving end, a first count value corresponding to the WIS sublayer; and when the data frame carrying the 1588V2 packet is transmitted to the MAC sublayer, acquiring, by the receiving end, a second count value corresponding to the MAC sublayer, where the step of performing, by the receiving end, time synchronization adjustment on the receiving time includes:

performing, by the receiving end, the time synchronization adjustment on the receiving time according to a count difference between the first count value and the second count value, where the receiving time is a corresponding time at which the data frame carrying the 1588V2 packet is transmitted to the MAC sublayer.

With reference to the third aspect or the first implementation manner of the third aspect, in a second implementation manner of the third aspect, before the step of performing, by the receiving end, the time synchronization adjustment on the receiving time according to a count difference between the first count value and the second count value, the method further includes:

acquiring, by the receiving end, the count difference between the first count value and the second count value, where the step of the performing, by the receiving end, the time synchronization adjustment on the receiving time according to a count difference between the first count value and the second count value includes:

acquiring, by the receiving end, a time difference corresponding to the count difference; and performing, by the receiving end, the time synchronization adjustment on the receiving time according to the time difference.

According to a fourth aspect, an embodiment of the present invention provides a WAN interface based 1588V2 packet transmission apparatus, including:

a receiving unit, configured to receive a data frame that is sent by a sending end and carries a 1588V2 packet;

an acquiring unit, configured to acquire a receiving time at which the receiving unit receives the data frame; and an adjusting unit, configured to perform time synchronization adjustment on the receiving time acquired by the acquiring unit.

In a first implementation manner of the fourth aspect, the apparatus further includes:

a configuring unit, configured to configure a synchronous counter separately for a wide area network interface WIS sublayer and a media access control MAC sublayer, where the acquiring unit is further configured to: when the data frame carrying the 1588V2 packet is transmitted to the WIS sublayer, acquires a first count value that is corresponding to the WIS sublayer and configured by the configuring unit;

the acquiring unit is further configured to: when the data frame carrying the 1588V2 packet is transmitted to the MAC sublayer, acquires a second count value that is corresponding to the MAC sublayer and configured by the configuring unit; and the adjusting unit is further configured to perform the time synchronization adjustment on the receiving time according to a count difference between the first count value and the second count value, where the receiving time is a corresponding time at which the data frame carrying the 1588V2 packet is transmitted to the MAC sublayer.

With reference to the fourth aspect or the first implementation manner of the fourth aspect, in a second implementation manner of the fourth aspect, the acquiring unit is further configured to acquire the count difference between the first count value and the second count value, where the adjusting unit includes:

an acquiring module, configured to acquire a time difference corresponding to the count difference; and an adjusting module, configured to perform the time synchronization adjustment on the receiving time according to the time difference acquired by the acquiring module.

According to the WAN interface based 1588V2 packet transmission method and apparatus that are provided by the embodiments of the present invention: first, a sending end inserts a 1588V2 packet into a payload area of a data frame, and sends, to a receiving end, the data frame carrying the 1588V2 packet; then the receiving end receives the data frame that is sent by the sending end and carries the 1588V2 packet, and acquires a receiving time at which the data frame is received; and finally, the receiving end performs time synchronization adjustment on the receiving time. Compared with that currently, a 1588V2 packet is sliced and inserted into an OH overhead segment for transmission, in the embodiments of the present invention, the 1588V2 packet is inserted into the payload area of the data frame for transmission, so that slicing and reassembling performed on the 1588V2 packet by using an assisting module can be avoided, thereby reducing complexity of 1588V2 packet transmission.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

Embodiment 1

Figure 1:
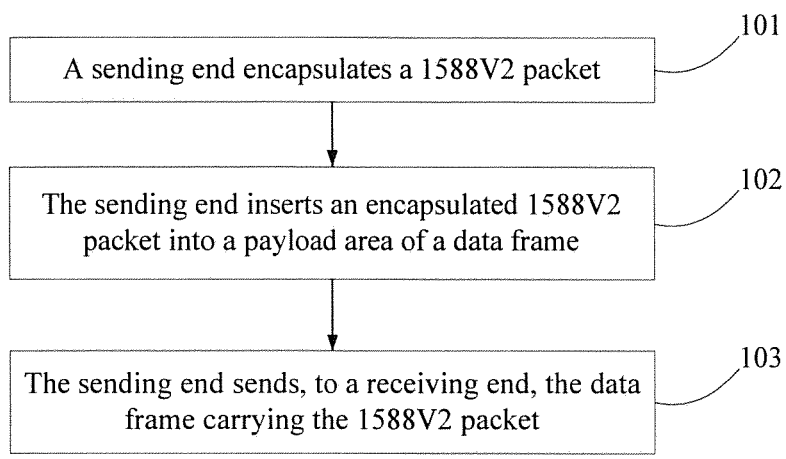
FIG. 1 is a flowchart of a WAN interface based 1588V2 packet transmission method according to Embodiment 1 of the present invention.

This embodiment of the present invention provides a WAN interface based 1588V2 packet transmission method, and as shown in FIG. 1, the method includes:

101: A sending end encapsulates a 1588V2 packet.

1588V2 is a precision time synchronization protocol standard issued by the IEEE (Institute of Electrical and Electronics Engineers, Institute of Electrical and Electronics Engineers) standard organization. In this embodiment of the present invention, the 1588V2 packet may be a packet of 44 bytes to 64 bytes, including a packet header of 34 bytes, time information of 10 bytes, and other packet information. The time information may be time information, at the sending end, of the 1588V2 packet.

For this embodiment of the present invention, the sending end may encapsulate the 1588V2 packet to make the 1588V2 packet carry one packet header, where the packet header includes an SMAC (Source Media Access Control, source address), a DMAC (Destination Media Access Control, destination address), and an Etype (Ethernet type, Ethernet type). The Etype is used to specify an Ethernet type of the 1588V2 packet. Specifically, if the Etype is 88F7, the Ethernet type of the 1588V2 packet is specified as a layer 2 Ethernet type; if the Etype is 0800, the Ethernet type of the 1588V2 packet is specified as a layer 3 Ethernet IPv4 (Internet Protocol version 4, Internet Protocol version 4) type; and if the Etype is 86DD, the Ethernet type of the 1588V2 packet is specified as a layer 3 Ethernet IPv6 (Internet Protocol version 6, Internet Protocol version 6) type.

For this embodiment of the present invention, the 1588V2 may be encapsulated at the sending end, and therefore the 1588V2 packet may carry a corresponding packet header, so that the 1588V2 packet may be successfully transmitted.

102: The sending end inserts an encapsulated 1588V2 packet into a payload area of a data frame.

The payload area of the data frame is an area, except a frame header and a frame trailer, in the data frame and used to transmit data, and the area is sufficient to store one encapsulated 1588V2 packet.

For this embodiment of the present invention, the sending end inserts the 1588V2 packet into the payload area of the data frame, so that slicing and reassembling performed on the 1588V2 packet by using an assisting module can be avoided, thereby reducing complexity of 1588V2 packet transmission.

103. The sending end sends, to a receiving end, the data frame carrying the 1588V2 packet.

Further, the receiving end performs time synchronization adjustment on a receiving time at which the data frame is received.

The 1588V2 packet may be transmitted between an IP network and an SDH network by using a WAN interface, or may be transmitted between IP networks by using a WAN interface, which is not limited in this embodiment of the present invention.

Figure 2:
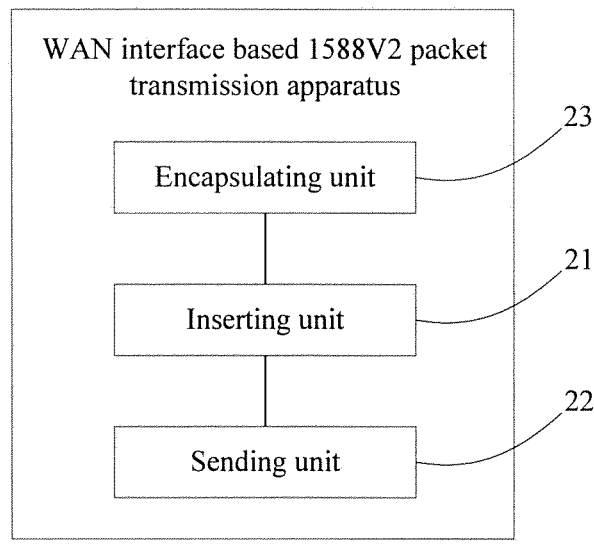
FIG. 2 is a schematic structural diagram of a WAN interface based 1588V2 packet transmission apparatus according to Embodiment 1 of the present invention.

Further, as a specific implementation of the method shown in FIG. 1, this embodiment of the present invention provides a WAN interface based 1588V2 packet transmission apparatus. As shown in FIG. 2, an entity of the apparatus may be a sending end, such as an IP network device and an SDH network device. The apparatus includes: an inserting unit 21 and a sending unit 22.

The inserting unit 21 is configured to insert a 1588V2 packet into a payload area of a data frame.

The sending unit 22 is configured to send, to a receiving end, the data frame carrying the 1588V2 packet inserted by the inserting unit 21.

Optionally, the apparatus may further include: an encapsulating unit 23.

The encapsulating unit 23 is configured to encapsulate the 1588V2 packet.

The inserting unit 21 is further configured to insert the 1588V2 packet, encapsulated by the encapsulating unit 23, into the payload area of the data frame.

Figure 3:
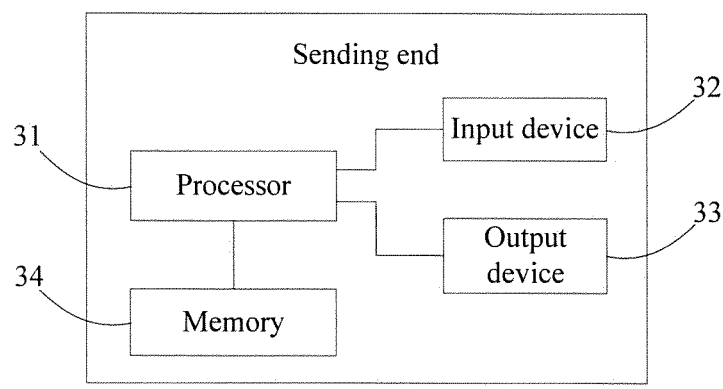
FIG. 3 is a schematic structural diagram of a sending end according to Embodiment 1 of the present invention.

Further, an entity of the WAN interface based 1588V2 packet transmission apparatus may be a sending end. As shown in FIG. 3, the sending end may include: a processor 31, an input device 32, an output device 33, and a memory 34. The input device 32, where the output device 33, and the memory 34 are separately connected to the processor 31.

The processor 31 is configured to insert a 1588V2 packet into a payload area of a data frame.

The processor 31 is further configured to send, to a receiving end, the data frame carrying the 1588V2 packet.

The processor 31 is further configured to encapsulate the 1588V2 packet.

The processor 31 is further configured to insert an encapsulated 1588V2 packet into the payload area of the data frame.

It should be noted that, for other corresponding descriptions corresponding to the functional units in the WAN interface based 1588V2 packet transmission apparatus provided by this embodiment of the present invention, reference may be made to corresponding descriptions in FIG. 1, and no details are repeatedly described herein again.

According to the WAN interface based 1588V2 packet transmission method and apparatus that are provided by this embodiment of the present invention: first, a sending end inserts a 1588V2 packet into a payload area of a data frame, and sends, to a receiving end, the data frame carrying the 1588V2 packet; then the receiving end receives the data frame that is sent by the sending end and carries the 1588V2 packet, and acquires a receiving time at which the data frame is received; and finally, the receiving end performs time synchronization adjustment on the receiving time. Compared with that currently, a 1588V2 packet is sliced and inserted into an OH overhead segment for transmission, in this embodiment of the present invention, the 1588V2 packet is inserted into the payload area of the data frame for transmission, so that slicing and reassembling performed on the 1588V2 packet by using an assisting module can be avoided, thereby reducing complexity of 1588V2 packet transmission.

Embodiment 2

Figure 4:
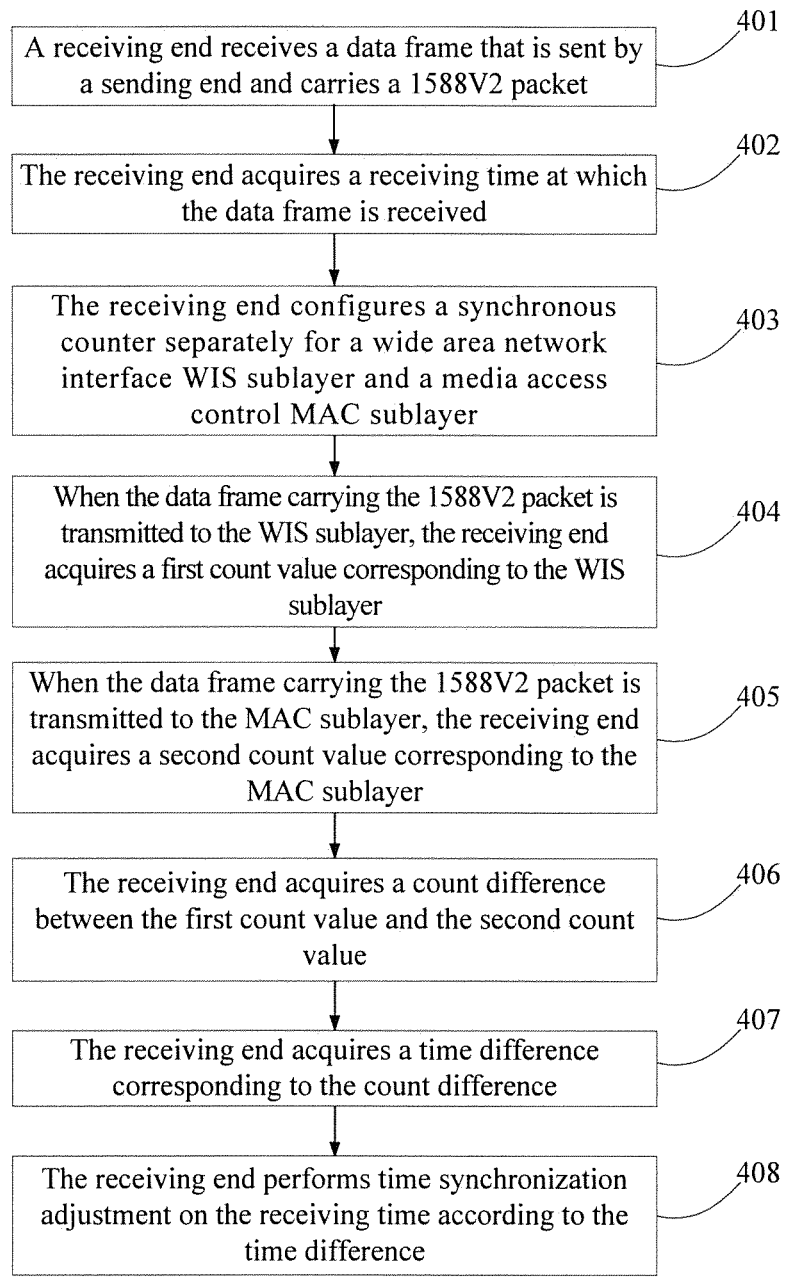
FIG. 4 is a flowchart of a WAN interface based 1588V2 packet transmission method according to Embodiment 2 of the present invention.

This embodiment of the present invention provides a WAN interface based 1588V2 packet transmission method, and as shown in FIG. 4, the method includes:

401: A receiving end receives a data frame that is sent by a sending end and carries a 1588V2 packet.

The 1588V2 packet may be a packet of 44 bytes to 64 bytes, including a packet header of 34 bytes and time information of 10 bytes to 30 bytes. The time information in the 1588V2 packet may be time information, at the sending end, of the 1588V2 packet. The packet header includes an SMAC, a DMAC, and an Etype. The Etype is used to specify an Ethernet type of the 1588V2 packet. Specifically, if the Etype is 88F7, the Ethernet type of the 1588V2 packet is specified as a layer 2 Ethernet type; if the Etype is 0800, the Ethernet type of the 1588V2 packet is specified as a layer 3 Ethernet IPv4 type; and if the Etype is 86DD, the Ethernet type of the 1588V2 packet is specified as a layer 3 Ethernet IPv6 type.

For this embodiment of the present invention, the 1588V2 packet may be transmitted between an IP network and an SDH network by using a WAN interface, or may be transmitted between IP networks by using a WAN interface, which is not limited in this embodiment of the present invention.

402: The receiving end acquires a receiving time at which the data frame is received.

The receiving time is a corresponding time at which the data frame carrying the 1588V2 packet is transmitted to a MAC (Media Access Control, media access control) sublayer of the receiving end.

Figure 7:
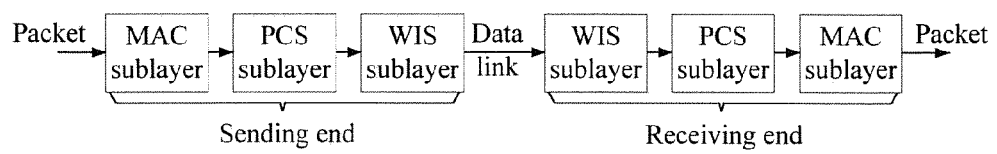
FIG. 7 is a schematic diagram of 1588V2 packet transmission between networks according to Embodiment 2 of the present invention.

For this embodiment of the present invention, between an IP network and an SDH network or between IP networks, packet transmission is performed based on a WAN interface. Specifically, as shown in FIG. 7, when a packet is transmitted based on a WAN interface, the packet sequentially passes through a MAC sublayer, a PCS (physical coding sublayer, physical coding sublayer), and a WIS (WAN Interface Sublayer, wide area network interface sublayer) that are of a sending end, and a data link between the sending end and a receiving end, and sequentially arrives at a WIS sublayer, a PCS sublayer, and a MAC sublayer that are of the receiving end. In this embodiment of the present invention, the sending end may acquire a corresponding sending time at the MAC sublayer of the sending end, and the receiving end may acquire a corresponding receiving time at the MAC sublayer of the receiving end.

403: The receiving end configures a synchronous counter separately for a wide area network interface WIS sublayer and a media access control MAC sublayer.

For this embodiment of the present invention, the synchronous counter is separately configured for the WIS sublayer and the MAC sublayer, so that count values based on a same standard may be acquired separately at the WIS sublayer and the MAC sublayer.

404: When the data frame carrying the 1588V2 packet is transmitted to the WIS sublayer, the receiving end acquires a first count value corresponding to the WIS sublayer.

The first count value corresponding to the WIS sublayer is a time identifier corresponding to the WIS sublayer.

405: When the data frame carrying the 1588V2 packet is transmitted to the MAC sublayer, the receiving end acquires a second count value corresponding to the MAC sublayer.

The second count value corresponding to the MAC sublayer is a time identifier corresponding to the MAC sublayer. In this embodiment of the present invention, at a same time, the first count value corresponding to the WIS sublayer and the second count value corresponding to the MAC sublayer are the same.

406: The receiving end acquires a count difference between the first count value and the second count value.

The count difference is the second count value minus the first count value. For example, if the first count value is 202 and the second count value is 208, the count difference between the first count value and the second count value is 6.

407: The receiving end acquires a time difference corresponding to the count difference.

For this embodiment of the present invention, a correspondence between the count difference and the time difference may be pre-configured by the receiving end, which is not limited in this embodiment of the present invention. For example, every period of the count difference may equal 0.5 milliseconds. If the count difference acquired by the receiving end is 6, the time difference corresponding to the count difference is 3 milliseconds; and if the count difference acquired by the receiving end is 20, the time difference corresponding to the count difference is 10 milliseconds.

408: The receiving end performs time synchronization adjustment on the receiving time according to the time difference.

Specifically, the receiving end performs the time synchronization adjustment on the receiving time by subtracting the time difference from the receiving time. For example, if the receiving time acquired by the receiving end is 11:32:20:038, and the corresponding time difference is 8 milliseconds, a receiving time after the time synchronization adjustment is performed on the receiving time by the receiving end is 11:32:20:030.

For this embodiment of the present invention, the receiving end performs the time synchronization adjustment on the receiving time, so that time synchronization is achieved between the sending end and the receiving end, and therefore time synchronization for packet transmission is performed between an IP network and an SDH network or between an IP network and an IP network. Optionally, the time information carried in the 1588V2 packet sent by the sending end may be time information that is after the time synchronization adjustment is performed by using a time synchronization adjustment method provided by this embodiment of the present invention, and the receiving end records, in the time information of the 1588V2 packet, a receiving time that is after the time synchronization adjustment is performed by using the time synchronization adjustment method provided by this embodiment of the present invention. In this embodiment of the present invention, by using a sending time that is carried in the 1588V2 packet and is after the time synchronization adjustment is performed and the receiving time that is carried in the 1588V2 packet and is after the time synchronization adjustment is performed, a path delay (Delay) and a time offset (Offset) that are between different networks may be obtained through calculation, so that time synchronization adjustment may be performed, according to the path delay and the time offset, on network devices that are separately corresponding to the different networks.

Figure 8:
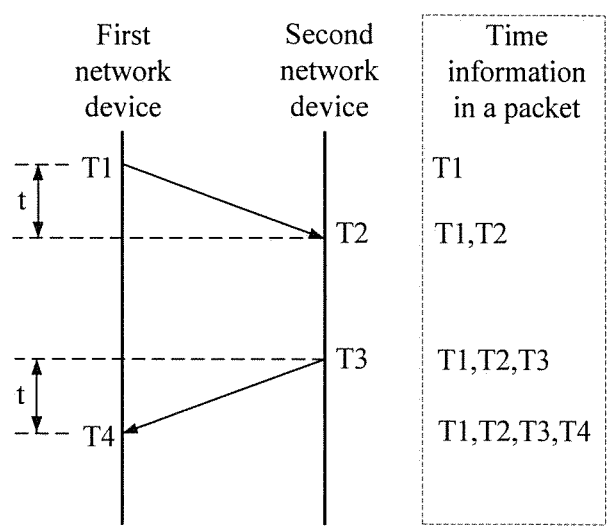
FIG. 8 is a schematic principle diagram of 1588V2 time synchronization according to Embodiment 2 of the present invention.

Specifically, as shown in FIG. 8, a time at which a 1588V2 packet is sent from a first network device is T1, a time at which the 1588V2 packet is received by a second network device is T2, a time at which a 1588V2 packet is sent from the second network device is T3, and a time at which the 1588V2 packet is received by the first network device is T4, where T1, T2, T3, and T4 all are times that are after time synchronization adjustment is performed by using the time synchronization adjustment method provided by this embodiment of the present invention. According to formulas:

Delay=[(T4−T1)−(T3−T2)]/2

Offset=[(T2−T1)+(T3−T4)]/2 corresponding path delay and time offset are calculated, so that time synchronization adjustment is performed on the first network device and the second network device.

Figure 5:
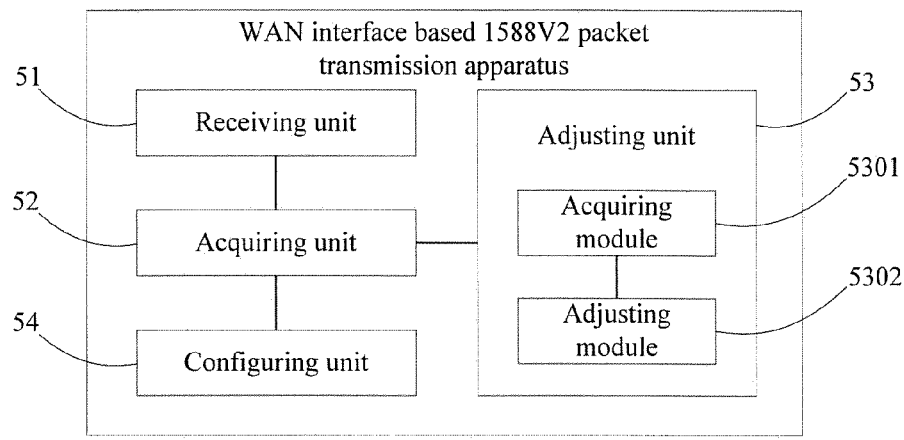
FIG. 5 is a schematic structural diagram of a WAN interface based 1588V2 packet transmission apparatus according to Embodiment 2 of the present invention.

Further, as a specific implementation of the method shown in FIG. 4, this embodiment of the present invention provides a WAN interface based 1588V2 packet transmission apparatus. As shown in FIG. 5, an entity of the apparatus may be a receiving end, such as an IP network device and an SDH network device. The apparatus includes: a receiving unit 51, an acquiring unit 52, and an adjusting unit 53.

The receiving unit 51 is configured to receive a data frame that is sent by a sending end and carries a 1588V2 packet.

The acquiring unit 52 is configured to acquire a receiving time at which the receiving unit 51 receives the data frame.

The adjusting unit 53 is configured to perform time synchronization adjustment on the receiving time acquired by the acquiring unit 52.

Optionally, the apparatus further includes: a configuring unit 54.

The configuring unit 54 is configured to configure a synchronous counter separately for a wide area network interface WIS sublayer and a media access control MAC sublayer.

The acquiring unit 52 is further configured to acquire, when the data frame carrying the 1588V2 packet is transmitted to the WIS sublayer, a first count value that is corresponding to the WIS sublayer and configured by the configuring unit 54.

The acquiring unit 52 is further configured to acquire, when the data frame carrying the 1588V2 packet is transmitted to the MAC sublayer, a second count value that is corresponding to the MAC sublayer and configured by the configuring unit 54.

The adjusting unit 53 is further configured to perform the time synchronization adjustment on the receiving time according to a count difference between the first count value and the second count value.

The receiving time is a corresponding time at which the data frame carrying the 1588V2 packet is transmitted to the MAC sublayer.

The acquiring unit 52 is further configured to acquire the count difference between the first count value and the second count value.

The adjusting unit 53 includes: an acquiring module 5301 and an adjusting module 5302.

The acquiring module 5301 is configured to acquire a time difference corresponding to the count difference.

The adjusting module 5302 is configured to perform the time synchronization adjustment on the receiving time according to the time difference acquired by the acquiring module 5301.

Figure 6:
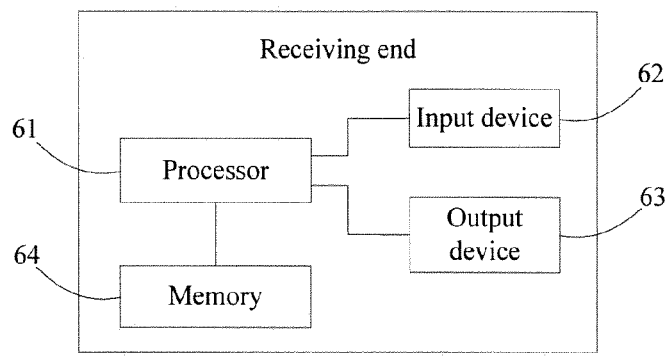
FIG. 6 is a schematic structural diagram of a receiving end according to Embodiment 2 of the present invention.

Further, an entity of the WAN interface based 1588V2 packet transmission apparatus may be a receiving end. As shown in FIG. 6, the receiving end may include: a processor 61, an input device 62, an output device 63, and a memory 64, where the input device 62, the output device 63, and the memory 64 are separately connected to the processor 61.

The processor 61 is configured to receive a data frame that is sent by a sending end and carries a 1588V2 packet.

The processor 61 is further configured to acquire a receiving time at which the data frame is received.

The processor 61 is further configured to perform time synchronization adjustment on the receiving time.

The processor 61 is further configured to configure a synchronous counter separately for a wide area network interface WIS sublayer and a media access control MAC sublayer.

The processor 61 is further configured to acquire, when the data frame carrying the 1588V2 packet is transmitted to the WIS sublayer, a first count value corresponding to the WIS sublayer.

The processor 61 is further configured to acquire, when the data frame carrying the 1588V2 packet is transmitted to the MAC sublayer, a second count value corresponding to the MAC sublayer.

The processor 61 is further configured to perform the time synchronization adjustment on the receiving time according to a count difference between the first count value and the second count value.

The receiving time is a corresponding time at which the data frame carrying the 1588V2 packet is transmitted to the MAC sublayer.

The processor 61 is further configured to acquire the count difference between the first count value and the second count value.

The processor 61 is further configured to acquire a time difference corresponding to the count difference.

The processor 61 is further configured to perform the time synchronization adjustment on the receiving time according to the time difference.

It should be noted that, for other corresponding descriptions corresponding to the functional units in the WAN interface based 1588V2 packet transmission apparatus provided by this embodiment of the present invention, reference may be made to corresponding descriptions in FIG. 4, and no details are repeatedly described herein again.

According to the WAN interface based 1588V2 packet transmission method and apparatus that are provided by this embodiment of the present invention: first, a sending end inserts a 1588V2 packet into a payload area of a data frame, and sends, to a receiving end, the data frame carrying the 1588V2 packet; then the receiving end receives the data frame that is sent by the sending end and carries the 1588V2 packet, and acquires a receiving time at which the data frame is received; and finally, the receiving end performs time synchronization adjustment on the receiving time. Compared with that currently, a 1588V2 packet is sliced and inserted into an OH overhead segment for transmission, in this embodiment of the present invention, the 1588V2 packet is inserted into the payload area of the data frame for transmission, so that slicing and reassembling performed on the 1588V2 packet by using an assisting module can be avoided, thereby reducing complexity of 1588V2 packet transmission.

The WAN interface based 1588V2 packet transmission apparatus provided by the embodiments of the present invention can implement the foregoing method embodiment. For specific implementation of functions, reference may be made to descriptions in the method embodiment, and no details are repeatedly described herein again. The WAN interface based 1588V2 packet transmission method and apparatus that are provided by this embodiment of the present invention are applicable to 1588V2 packet transmission between networks, but are not limited thereto.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wide area network (WAN) interface based 1588V2 packet transmission method, comprising:

receiving, by a receiving end, a data frame that is sent by a sending end and carries a 1588V2 packet;

acquiring, by the receiving end, a receiving time at which the data frame is received;

performing, by the receiving end, time synchronization adjustment on the receiving time; wherein before performing, by the receiving end, time synchronization adjustment on the receiving time, the method further comprises:

configuring, by the receiving end, a synchronous counter separately for a wide area network interface sublayer (WIS) and a media access control (MAC) sublayer;

when the data frame carrying the 1588V2 packet is transmitted to the WIS, acquiring, by the receiving end, a first count value corresponding to the WIS; and when the data frame carrying the 1588V2 packet is transmitted to the MAC sublayer, acquiring, by the receiving end, a second count value corresponding to the MAC sublayer; and performing, by the receiving end, time synchronization adjustment on the receiving time comprises:
performing, by the receiving end, the time synchronization adjustment on the receiving time according to a count difference between the first count value and the second count value, wherein the receiving time is a corresponding time at which the data frame carrying the 1588V2 packet is transmitted to the MAC sublayer.

2. The method according to claim 1, wherein:
before performing, by the receiving end, the time synchronization adjustment on the receiving time according to a count difference between the first count value and the second count value, the method further comprises:
acquiring, by the receiving end, the count difference between the first count value and the second count value; and
performing, by the receiving end, the time synchronization adjustment on the receiving time according to a count difference between the first count value and the second count value comprises:
acquiring, by the receiving end, a time difference corresponding to the count difference, and
performing, by the receiving end, the time synchronization adjustment on the receiving time according to the time difference.

3. A wide area network (WAN) interface based 1588V2 packet transmission apparatus, comprising:

a processor; and
a non-transitory storage memory storing instructions that, when executed by the processor, cause the apparatus to:
receive a data frame that is sent by a sending end and carries a 1588V2 packet,
acquire a receiving time when the data frame is received,
configure a synchronous counter separately for a wide area network interface sublayer (WIS) and a media access control (MAC) sublayer,
when the data frame carrying the 1588V2 packet is transmitted to the WIS, acquire a first count value that is corresponding to the WIS,
when the data frame carrying the 1588V2 packet is transmitted to the MAC sublayer, acquire a second count value that is corresponding to the MAC sublayer, and
perform time synchronization adjustment on the receiving time according to a count difference between the first count value and the second count value, wherein the receiving time is a corresponding time at which the data frame carrying the 1588V2 packet is transmitted to the MAC sublayer.

4. The apparatus according to claim 3, wherein the instructions, when executed by the processor, further cause the apparatus to:
acquire the count difference between the first count value and the second count value;
acquire a time difference corresponding to the count difference, and
perform the time synchronization adjustment on the receiving time according to the time difference.

* * * * *